United States Patent
Shur

(10) Patent No.: US 6,330,672 B1
(45) Date of Patent: *Dec. 11, 2001

(54) METHOD AND APPARATUS FOR WATERMARKING DIGITAL BITSTREAMS

(75) Inventor: David Hilton Shur, Aberdeen, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,135

(22) Filed: Jun. 30, 1998

Related U.S. Application Data
(60) Provisional application No. 60/067,225, filed on Dec. 3, 1997.

(51) Int. Cl.[7] ............................................ H04L 9/00
(52) U.S. Cl. ......................... 713/176; 380/54; 382/251
(58) Field of Search .............................. 713/176; 380/54, 380/202; 705/51, 57, 58; 382/251, 100

(56) References Cited

U.S. PATENT DOCUMENTS

| | | | |
|---|---|---|---|
| 5,664,018 | * | 9/1997 | Leighton ................................ 380/54 |
| 5,724,277 | * | 3/1998 | Nakagawa ........................... 708/320 |
| 5,745,569 | * | 4/1998 | Moskowitz et al. .................... 705/58 |
| 5,889,868 | * | 3/1999 | Moskowitz et al. .................. 713/176 |
| 5,905,800 | * | 5/1999 | Moskowitz et al. .................... 380/28 |
| 6,064,764 | * | 5/2000 | Bhaskaran et al. ................... 382/183 |

FOREIGN PATENT DOCUMENTS

WO 9929114  *  6/1999  (WO) .

OTHER PUBLICATIONS

Schneier, "Applied Cryptography, 2nd Edition," pp. 372–379, 436–441, 454–455, and 574–577, 1996.*
Stephen S. Lavenberg, "Computer Performance Modeling Handbook", Chapter 5, Generation Methods for Discrete Event Simulation, pp. 223–245pp. 218–226, 1983.

* cited by examiner

Primary Examiner—Albert Decady
Assistant Examiner—Steve Kabakoff

(57) ABSTRACT

A signal is encoded, for example, perceptually and, during or after the perceptual coding process, a digital watermark is inserted into a quantized digital information signal resulting from the perceptual coding process in such a manner that its insertion is imperceptible to one later listening to, displaying or otherwise utilizing the information signal. Moreover, the digital watermark may be inserted in accordance with a key indicative of the location of the mark in the digitally encoded signal. The key may be protected with a trusted entity and distributed in such a manner as to be not detectable by a pirate. Consequently, the key may be utilized at watermarking apparatus that can be located anywhere in the distribution channel of a copyright protected work. The key may be embedded in a secure microprocessor of validating apparatus at a point of distribution or even at a point of sale. In this manner, when or after a digital bitstream is fixed in a medium of expression or broadcast, the watermark can be applied at the time of fixing in a copy, thus validating an original legitimate copy. For example, a compact disc recording may be validated at the point of sale as an authorized copy through watermarking (validating) apparatus according to the present invention or, at the time of broadcast over radio frequencies or distribution via the Internet, information may be watermarked. In this manner, even though a work may be pirated, further information may be included or otherwise indicated by the watermark to assist in, not only recognizing a pirated work and the original from which the pirate copy was produced, but the identity of the pirate who later makes an unauthorized copy of the original.

36 Claims, 4 Drawing Sheets

METHOD AND APPARATUS FOR WATERMARKING DIGITAL BITSTREAMS

This application claims priority to and is based in part on provisional application No. 60/067,225 filed Dec. 3, 1997 and entitled "On Combining Watermarking with Perceptual Coding" of J. Lacy et al.

BACKGROUND OF THE INVENTION

1. Technical Field

The present invention relates to the field of protecting copyrighted works from piracy by fingerprinting or watermarking the copyrighted information and, more particularly, to a method and apparatus for inserting hidden data such as a digital watermark into a signal representing a copyrighted work simultaneously with or immediately after 1) perceptually encoding a digital representation of an audio signal or 2) perceptually or otherwise coding a digital representation of a video signal or other information carrying signal.

2. Description of the Related Arts

Piracy of copyrighted works is a serious problem. By way of example, street vendors in metropolitan areas offer videotapes, audio compact discs, audio tapes and the like which appear on their surface to have been properly distributed and offered for sale with the permission of or under license to the copyright owner, when, in fact, they are not. Computer software and games are distributed freely via the Internet and pirate copies abound. There are many ways a pirate can obtain free access to a copyrighted work that is original. By "original" as intended herein, we define "original" as an original or master copy from which other copyright owner authorized copies have been made or an "original" is an authorized copy made from the original or master copy. All other copies will be defined herein as "pirate" copies and comprise copies that are not authorized by a copyright owner.

By way of example of the ease with which a pirate is able to make a pirate copy, the pirate can produce a high quality, perhaps, perfect reproduction from an original that they have legitimately purchased or otherwise legitimately obtained, can record a live performance for which copyright protection is asserted or can record from a broadcast performance of a live or copied performance. Other means of pirating are best known to the pirates themselves.

It is an objective of the present invention to protect a copyrighted work. Protection methods are known. Despite efforts by pirates to make a copyrighted work appear to be an original, a method is known to attempt to hide in the copyrighted work itself indicia of the copyright owner's identity and source. The burying of such indicia perhaps began with early map-makers who would "fingerprint" their work by intentionally placing an error in the map. The map maker could quickly look at a copy, recognize their fingerprint (intentional error) and then accuse the individual offering the map of infringement, knowing the offeror to not be authorized to do so. Today, it is known to embed in integrated circuits a fingerprint or indicia of ownership that may appear on the surface to comprise a circuit component, when in fact, the indicia comprises a fingerprint intended by the owner to deceive a pirate.

With works created on paper, it is known to "watermark" the paper itself with indicia of its source. For example, since the mid-1800's, it became known and desirable to protect the authenticity of such items of value as postage stamps and currency from copying/counterfeiting by watermarking the item of value. A watermarked item of value or legal document can both identify and verify the source of the document.

As used herein, by fingerprinting and watermarking, no distinction is intended between them regardless of their historical distinctions. Watermarking as used herein is intended to refer to either term and to signify the same process; namely, it is an objective of watermarking to identify and to verify the source of an original as defined above.

According to the prior art, it is not only known to use watermarking for works created on paper but also for protecting analog or digital signals representative of a copyrighted work. For example, in binary digital bitstreams for transmitting digital audio signals in a cable television system, it is known to identify, for example, the title, track and artist in a header portion of blocks of data representative of a copyrighted work. The problem with such systems is that the location of the header carrying such a watermark can be easily become known to a would-be pirate. It always appears at the beginning of the work. Consequently, the watermark can be easily removed.

Digimark Corporation of Portland, Oregon offers a method of watermarking images that may represent copyrighted works. In particular, pixels within digital photographic images carry a digital watermark prior to distribution of the images, for example, over the Internet. By hiding the watermark within the image itself, it is expected that a pirate will have difficulty locating the watermark. Consequently, it is a further objective of the present invention to not only apply a watermark but apply a watermark in such a manner as to disguise its location from a pirate so the pirate cannot simply remove it.

In the art of coding copyrighted works, there has been a recent movement toward perceptual coding. Perceptual coding relates to coding and decoding designed to recognize that the signal fidelity perceived by humans is a better quality measure than "fidelity" computed by traditional distortion measures. Traditionally, for example, it might be a measure of quality to assert that a speaker has a flat frequency response across the spectrum of frequencies between 0 frequency and 20,000 Hertz. On the other hand, the human ear may not be able to even hear frequencies at the lower or higher end of the spectrum. Now, for example, in audio, quality is defined to mean "listener indistinguishable from compact disc audio," generally regarded today as the best quality audio in comparison with tape, record or earlier forms of recording a live performance.

Patents describing audio perceptual coding include U.S. Pat. No. 5,285,498 of Johnston issued in 1994. FIGS. 1 and 2 of the '498 patent generally describe prior art perceptual coders, typically involving the conversion of analog data to digital, a transformation of the digital data in association with a perceptual model and a quantizer. Recent articles on perceptual encoding/decoding include: "AT&T Perceptual Audio Coding (PAC)" of Johnston et al., Collected Papers on Digital Audio Bit-Rate Reduction, Feb. 13, 1996 and the following three papers "MPEG-2 Audio Stereo and Multichannel Coding Methods" by Johnston et al.; "ISO/IEC MPEG-@ Advanced Audio Coding" by Bosi et al.; and "Enhancing the Performance of Perceptual Audio Coders by Using Temporal Noise Shaping (TNS)" by Herre et al., all published with Conference Papers of the $101^{st}$ Convention of the Audio Engineering Society, November 8–11, 1996. The recent papers describe alternative embodiments and enhancements to the original perceptual coding apparatus and methods described, for example, by Johnston in the '498 patent and his predecessors. Recently filed patent applications on related subject matter incorporated by reference herein include U.S. Pat. No. 6,111,844, issued Aug. 29, 2000 entitled "Quality Degradation Through Compression/ Decompression" and U.S. application Ser. No. 08/888,014 entitled "Custom Character Coding Compression for Encoding and Watermarking Media Content," mailed Jul. 3, 1997. Also, this application claims priority to U.S. provisional application Ser. No. 60/067,225 filed Dec. 3, 1997 entitled "On Combining Watermarking with Perceptual Coding." This application, converted to a regular application, has been published as WO99/29114 on Jun. 10, 1999.

By perceptual coder as used herein is intended a general form of coder which may comprise simple perceptual coders or more complex perceptual coders, for example, hybrid coders, integrated source-model perceptual coders and perceptual coders using temporal noise shaping among other coders.

Information carrying signals that have high information content do not appear to be susceptible to elimination of "irrelevance" and perceptual coding. For example, a digital data computer program may have an undiscovered and so not particularly "relevant" embedded subroutine. Nevertheless, compression principles may still be applied to such a signal to eliminate redundancy. Yet, perceptual coding may be applied to such a signal for at least the latter reason.

The ability to easily replicate digital audio, video, computer program, game and other data, protectable by copyright, by simply copying binary bitstreams is a major impediment to the use of the Internet or other telecommunications channels for content distribution/sale. Consequently, it is a further objective of the present invention to eliminate such an impediment to commerce over the "information superhighways" of the future.

Thus, in view of the above, it is an object of the present invention to provide apparatus and a method of watermarking a video television signal as well as an audio or other information carrying signal and open up the information superhighway to free commerce in protected data.

SUMMARY OF THE INVENTION

According to the principles of the present invention, a signal is encoded, for example, perceptually and, during or after the perceptual coding process, a digital data sequence, for example, a digital watermark is inserted into a quantized digital signal resulting from the perceptual coding process in such a manner that its insertion is imperceptible to one later listening to, displaying or otherwise utilizing the signal. Moreover, the digital watermark may be inserted in accordance with a key indicative of the location of the mark in the digitally encoded signal. The key may be protected and secured with a trusted entity and distributed in such a manner as to be not detectable by a pirate. Consequently, it is a principle of the present invention that the key may be utilized at watermarking apparatus that can be located anywhere in the distribution channel of a copyright protected work. The key may be embedded in a secure microprocessor of validating apparatus at a point of distribution or even a point of sale. In this manner, when or after a digital bitstream is fixed in a medium of expression or broadcast, the watermark can be applied at the time of fixing in a copy, thus validating a copy. For example, a compact disc recording may be validated at the point of sale as an authorized copy through watermarking (validating) apparatus according to the present invention or, at the time of broadcast over radio frequencies or distribution via the Internet, information may be watermarked. In this manner, even though a work may be pirated, further information may be included or otherwise indicated by the watermark to assist in not only recognizing a pirated work and the original from which the pirate copy was produced but the identity of the pirate.

In U.S. Patent Application Serial No., entitled "Custom Character-Coding Compression for Encoding and Watermarking Media Content" (Attorney Docket Number Lacy 3-5-6) filed Jul. 3, 1997, it has already been suggested to use designated symbols in one or more Huffinan codebooks for embedding a watermark in a compressed bit stream. The value of the watermark bits recovered from the bitstream depend either on the values associated with the symbols or the position of the symbol in the compressed bit stream.

Thus, the present invention also includes dependent features directed to the information contained within the watermark itself. Not only will the watermark identify the work, identify the source of the work, and identify the author but may identify variable information such as the date and time the original was distributed or broadcast, the identity of the seller, the identity of the purchaser and the location from which the original was distributed or broadcast. While purchase/sale is presumed in this comment, the actual form of contractual arrangement may differ between parties in the distribution channel. For example, the work may be legitimately sold, licensed, leased for a period of time and the like all within the boundaries of being an original. Consequently, an applied digital watermark may further comprise indicia of the form of the transaction, and, for example, if the transaction represents a lease, the expiration date of the lease. If the transaction is a limited play license defined by a number of plays, the watermark may comprise data indicating the number of licensed plays. On the other hand, from the transaction date or expiration date forward or after the number of licensed plays has been spent, if a copy of the original appears after that date, the copy can be identified as a pirate copy and the pirate identified.

The invention also considers the player, computer or other device upon which a legitimate recipient or pirate uses or plays the protected work. The device may require the key to play the work. The key may be extracted from the compressed digital bitstream or distributed personally, for example, as a memory or "smart" card or the decoder require both kinds of keys to operate. Even if the key is provided, the device may comprise a time-of-day clock that, upon expiration of the period of the lease, actuates the device to preclude further play.

In summary then, apparatus for inserting a digital watermark into protected information comprises a perceptual coder for coding an information signal representative of the protected information, a watermark location selector responsive to the perceptual coder for selecting a location for inserting a digital watermark, a digital watermark generator for generating a digital watermark and a quantizer of the perceptual coder responsive to the digital watermark detector and the watermark location selector for inserting a digital watermark at selected locations within an output bitstream including the perceptually coded information signal.

A method for inserting a digital watermark into protected information comprises the steps of perceptually encoding an information signal representative of the protected information, selecting, responsive to the perceptual coding step, a location for inserting a digital watermark, generating a digital watermark, and during perceptual coding, quantizing the information signal to insert the generated digital watermark at selected locations within an output bitstream including the perceptually coded information signal.

Other features and advantages of the present invention will become clear from an understanding of the following detailed description with reference to the drawings.

DETAILED DESCRIPTION

Figure 1A:
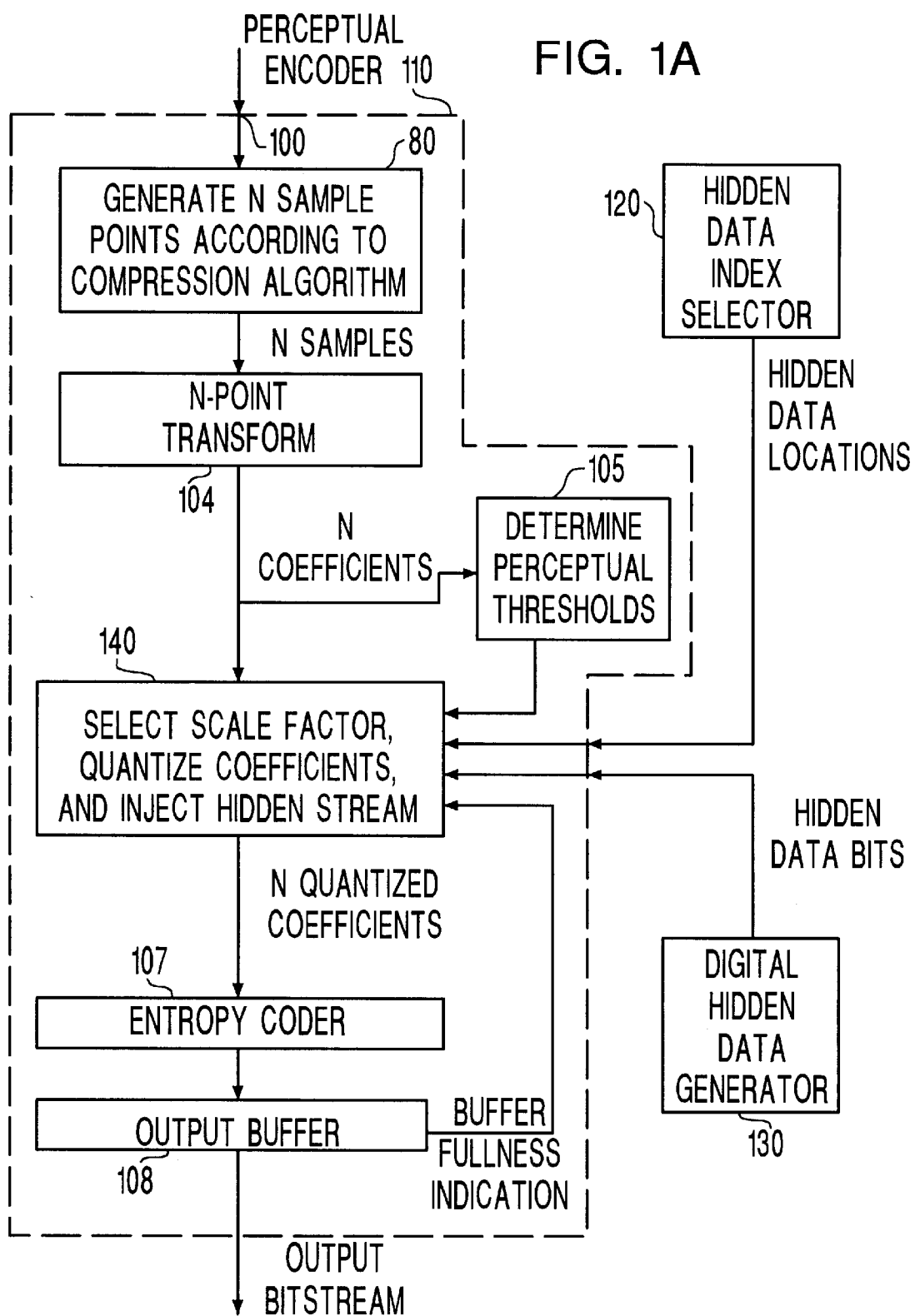
FIG. 1 is a block schematic diagram of apparatus for watermarking copyright protected information according to the present invention comprising a perceptual encoder, a watermark location (index) selector responsive to transformation processes of the perceptual coder for selecting a location within the perceptual coded bitstream for a watermark and a digital watermark generator, a quantizer of the perceptual coder outputting a digitally watermarked bitstream with a watermark inserted at the selected location; FIG. (a) provides details of a generalized digital encoder and FIG. 1(b) provides more specific details directed to the design of a particular digital encoder involving the encoding of an analog signal.
Figure 1B:
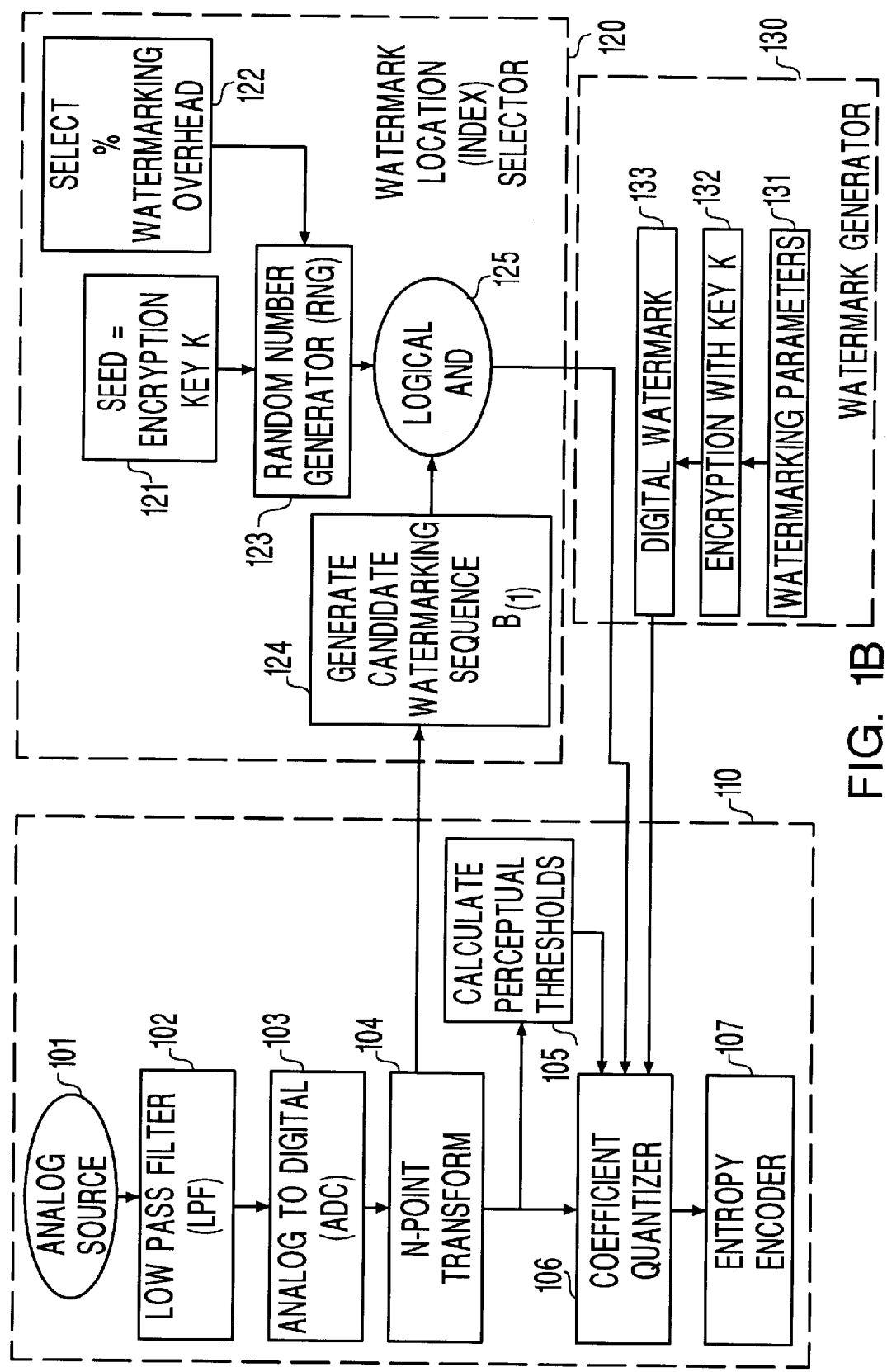

Now the present invention will be described referring to the drawings for one exemplary embodiment of the invention. FIG. 1(a) represents a block schematic diagram of a generalized digital encoder for embedding a hidden data stream into a digital information signal to be perceptually encoded according to the present invention. FIG. 1(b) represents a specific analog signal implementation of FIG. 1(a) including specific recommendations for implementation of encryption. Similar reference characters used in each drawing represent similar components. As has been described above, perceptual coding has evolved over the past several years from a concept to practical application. Moreover, several enhancements to perceptual coding/decoding techniques have evolved which describe enhanced or improved performance in one or another step or component of the encoding/decoding process.

Referring to FIG. 1(a), there is shown a perceptual coder 110, a hidden data index selector 120 for selecting an index or location to insert a hidden data sequence, for example, a digital watermark, into an information signal that is being perceptually coded and a digital hidden data generator 130. The entirety of perceptual coder 110 is drawn to generically describe the process of perceptual coding and is not intended to describe the most current or best manner of implementation. The method and means for perceptual encoding does not comprise the present invention, rather it is the manner and apparatus for inserting (and when appropriate, removing) a hidden data sequence such as a digital watermark into the coded, compressed signal as will be further described below. Each of the components of the perceptual coder 110 is known from the prior art and may comprise hardware, a software programed processor or firmware in implementation. Similarly, each of the components of the hidden data index selector 120 and digital hidden data generator 130 is known from the prior art individually. It is the combination of elements described by the claims which comprises the present invention.

An uncompressed digital data stream is presented to perceptual coder 110 at point 100. The uncompressed digital data stream may comprise audio, video, software algorithm, or other protectable digital data stream. What is intended by "protectable" is the protection of intellectual property by copyright, for example, any work that has been reduced to a tangible medium of expression including, but not limited to, audio, video, software or other work protectable by copyright.

The first task of the perceptual decoder as represented by step 80 is the generation of N sample points for the input digital stream of protectable information according to a compression algorithm. The compression algorithm is typically predetermined or selectable according to the type of presented data. For example, audio may be compressed differently from video data and the like. As a result of the sample point generation step 80, N samples are presented to an N-point transform step 104. N-point transform step 104 may comprise any one of a plurality of possible N-point transformations as will be further described herein. The result of the N-point transform step is N coefficients which are provided to quantization step 140 and to perceptual threshold determination step 105. Perceptual threshold determination step 105 may vary among types of information signals such as audio and video. Nevertheless, the objective of the perceptual threshold determination is a threshold for human perception such that below the threshold may be data points that are not perceptible to human perception but above the threshold are data points that are perceptible to human perception and thus represent data points that during compression and the quantization process may not be discounted.

Quantization step 140 may be generally described as the process of manipulating perceptual coding coefficients to insert a digital water mark into the perceptually coded bitstream. Quantization step 140 in one embodiment of the present invention represents three steps. The first and second of these relate to the expected tasks of the perceptual coder. The first step is to select a scale factor. The quantization scale factor may be different for different types of data, such as audio or video. The scale factor selection may be responsive to the perceptual threshold determination process. Once the scale factor is selected for the input N coefficients, the coefficients are quantized according to the selected scale factor. The output is N quantized coefficients representing the compressed digital bitstream.

The non-typical third step of quantizer 140 is the process of injecting a hidden data sequence or stream in indexed locations of the output compressed data stream according to, for example, an N-Point transformation process 104 as will be further described herein. The hidden data stream may represent a watermark for not only marking protected information as protected but assisting one in tracing a pirate of the protected information as will be further discussed herein. Hidden data index selector 120 responds to the N-point transform process 104 by identifying locations in the compressed digital information stream that a watermark may occupy. Digital hidden data generator 130 provides the data to be introduced or inserted onto the compressed information stream at the selected indices.

The output of quantizer 140 is N quantized coefficients representing a compressed information data stream including digital hidden data. The data stream is presented to an entropy encoder 107. Entropy encoder 107 performs the final stage of compression in a lossless (invertible) manner by encoding frequently occurring symbols using shorter codewords and less frequently occurring symbols using longer codewords. The use of shorter codewords exceeds the use of longer codewords and hence there is compression.

Entropy coder 107 provides an output which fills an output buffer 108 of compressed digital information signal (including hidden data). If the buffer is full, a buffer fullness indicator is fed back to the quantizer 140 to throttle or stop the quantization process. Otherwise, the output buffer 108 outputs an output compressed bitstream for, for example, recording, broadcast or other signal distribution.

One skilled in the art will be familiar with a variety of embodiments for implementing quantizer block 140 including all three steps of selecting a scale factor, quantizing coefficients and injecting the hidden data (watermark). Two embodiments are known for audio (the Advanced Audio Coding, AAC and Perceptual Audio Coding, PAC audio compression algorithms). Also, further embodiments are described for known (EG-2) video compression algorithms in the aboveidentified U.S. provisional application ser. No. 60/067,225 filed Dec. 3, 1997.

In both AAC and PAC audio compression algorithms, coefficients (also known as spectral values) are grouped into scale factor bands that are quantized with the same scale factor. Once coefficients are grouped into scale factor bands, an algorithm is used to quantize them according to the present invention. Distinct hidden data (watermark) bits can be inserted into each coefficient in a scale factor band that has at least one non-zero coefficient. As can be seen, the objectives, in either an audio or video embodiment, are achieved of embedding hidden data according to the modified scale factors generated by the algorithm into the output compressed information bit stream.

Now referring to FIG. 1(b), FIG. 1(b) represents an embodiment for perceptually encoding an analog signal containing protectable information and provides particular recommendations for generating a hidden data index and encrypting the hidden data (watermark). Generally, an analog signal for encoding is received into perceptual coder 110 at analog source 101. The analog signal comprises according to the present invention a signal representing protected information. The protected information itself may represent an audio performance, a video or visual performance, a computer software algorithm, a bitstream representing a book or novel or even be descriptive of other sensory signal (taste, touch or smell) that may be capable of perceptual coding. By way of example, the analog source may be a source of a combination of audio and visual signals and so represent the protected information content of a movie, computer game or live audio/visual performance such as a ballet or opera.

Typically, a low pass or other filter 102 is applied for filtering noise or segregating the bandwidth of the analog signal or related purpose. In this manner, the analog signal presented to the analog to digital converter 102 can be considered to be relatively pure of adverse influences and confined to a known or expected bandwidth of the signal.

Analog to digital converter 103 converts the analog signal (for example, voice or visual) to digital data. The digital data output from the A/D converter 103 may be considered a faithful representation of the filtered analog signal, except in binary form. Of course, if the data presented to the perceptual coder is already in digital form, neither steps 102 or 103 are required, for example, if the input is a digital computer software algorithm or game program.

Block 104 represents the transformation block of a perceptual coder, which for example, according to the prior art, may comprise an N point fast Fourier transform or a Modified Discrete Cosine Transform (MDCT) or other transform for perceptual coding. These are variously implemented according to the prior art; for example, an MDCT transform is implemented via a filter bank for transforming audio signals according to the '948 patent. The encoding process slices the time series into contiguous time segments and transforms each segment into the frequency domain. Once in the frequency domain, the spectral coefficients are compared with a perceptual threshold function T(f). This comparison step is shown in the diagram as calculation of perceptual thresholds step 105. If the coefficients are below the thresholds, the coefficients potentially can be discarded without any loss in perceived quality. Yet, these coefficients represent candidate locations for placement of at least a portion of a digital watermark. If above the thresholds, the coefficients are quantized and output as necessary data representative of the original analog signal 101.

Figure 2:
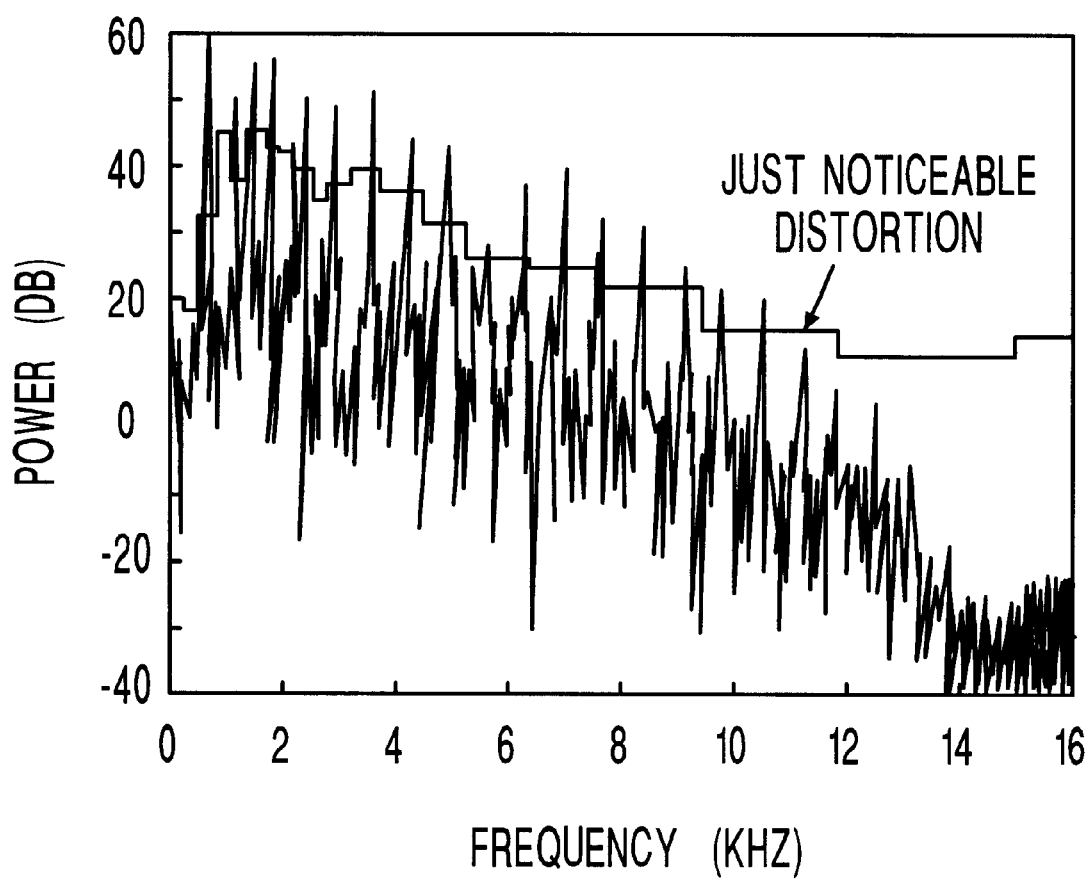
FIG. 2 comprises a typical power versus frequency spectrum of a trumpet useful for explaining principles of perceptual coding.

Referring briefly to FIG. 2, for example, there is shown a power versus frequency spectrum for the sound of a trumpet. Also, shown is the perceptual threshold function T(f) shown as a stair step curve C over the sound wave W. A great deal of the trumpet signal is below the perceptual threshold and may be discarded in a perceptual coder. All of these signal portions below the threshold function are candidate watermark locations. For example, humans can hardly, if at all, hear an audio signal at very low frequency. Neither can we humans hear an ultrasonic frequency. The peak in the threshold function T(f) model shown rises rapidly and then decreases steadily from approximately 1000 Hz out to 12,000 Hz. Thus, the highest fidelity sound may be considered wasted on the human ear and perceptibly equivalent quality can be achieved by only sending data indicative of the signal above the threshold function.

The quantizing step 106 follows the perceptual coding transformation. What is above the threshold is quantized and output as necessary data for reconstruction of the original analog signal 101. Quantization is the three step process described above in considerable detail. The output of the transformation process 104 is operated upon by the coefficient quantizer 106 in accordance with the calculated perceptual thresholds of the threshold function output from calculation block 105. For example, in an audio signal such as a power level of 40 dB at 1,000 Hz, it may be appropriate to quantize that level using a high resolution quantizer having a larger number of steps, for example, 8 or 16 bit coding. In perceptual coding, one probably would not quantize a DC signal at all, because the human ear cannot perceive 0 frequency, regardless of the power level.

The binary output of the coefficient quantizer 107 is, in the depicted embodiment, provided to an entropy encoder 107, already described above. The output of the entropy encoder is the digital bitstream that may be recorded on disc, tape or otherwise recorded or may be broadcast, transmitted or otherwise distributed from the point of sale or distribution. The output buffer 108, described above, is believed unnecessary especially in an embodiment contemplating immediate distribution at higher data rates than the rate of the compressed data stream output of entropy encoder 107.

In accordance with the present invention, the output binary bitstream contains a recoverable watermark generated by generator 130 and located in the bitstream according to the output of watermark location (index) selector 120. It is assumed that it is possible and desirable to alter some bits of an encoded audio, video or other digital bitstream without affecting the perceived quality of what is played out. A digital signature is created for a specific protected media stream. The signature may be a function of a number of identifying parameters as will be further described below, for example, associated with a specific location in the distribution channel, date and time of distribution and type of distribution transaction. The digital watermark or signature is created by encrypting the chosen set of parameters. The encryption key is intended to be kept secret and protected and secured by a trusted entity and only distributed in a protected manner, for example, embedded in a secure manner (for example, in a secure microprocessor) or distributed encrypted itself with yet another key. The key, as will be described below, may be provided to a legitimate recipient of an original (for example, if authentication must take place before the data can be decoded.) The watermark location (index) selector 120 operates via a signal from the transformation function 104 as to what coefficients are below the threshold. The above process of transformation 104 leads to a sequence of spectral samples whose coefficients are below the perceptual threshold which may referred to as a candidate watermarking sequence B(i). The sequence generated at block 124 represents all candidate opportunities for inserting watermarking data. The sequence is fed to a logical AND block 125 which receives an input that is generated, in one embodiment of the present invention, involving a seed 121 for generating an encryption key K and a selector 122 for selecting a desired percent of watermarking overhead. By watermarking overhead is intended the degree of watermarking, for example, measured by the amount of watermark information to be carried by the watermark as well as other factors.

A C(i) binary output sequence of a random number generator (RNG) 123 may be generated by any one of a number of approaches. One known approach involves controlling the generator by means of an input percent or probability. In accordance with the present invention, we assume the addition of some percent of watermarking overhead, for example, the probability of C(i)=1 equals x/100, where x/100, for example, may be 1%. Also assume a random number generator 123 generates numbers uniformly between 0 and m. For each member of the candidate watermarking sequence output at candidate generator 124, the random number generator 123 is called to output a random number. If the output is greater that $(1-x/100)^*m$, then, set C(i)=1; otherwise, we set C(i)=0. Other ways of generating a C(i) sequence may come to mind of those ordinarily skilled in the art as well.

There are likewise various possibilities for encoding the digital watermark data via watermark generator 130 as well. For example, where C(i), as above, equals one, and if T(f), the threshold function, is the perceptual threshold at spectral coefficient f for the ith member of the candidate watermarking sequence, then a one may be encoded as 2T(f)/3 and a zero as T(f)/3.

There are likewise various possibilities for encoding the digital watermark data via watermark generator 130 as well. For example, where B(i), as above, equals one. For example, if T(f), the threshold function, is the perceptual threshold at spectral coefficient f for the ith member of the candidate watermarking sequence, then a one may be encoded as 2T(f)/3 and a zero as T(f)/3.

Referring again to watermark selector 120, the seed and the watermark overhead selection are used as inputs to a random number generator 123 which outputs a binary sequence. While a random number generator (RNG) 123 is depicted, the generator 123 may comprise a pseudorandom number generator or other more predictable generator than one that is assumed to be more random, especially when it operates responsive to a seed. The output binary sequence of the RNG 123 and the candidate sequence B(i) are ANDed at logical AND gate 125 and its output result is used to index where in the quantizer 106 output a digital watermark is to be inserted.

Now an exemplary hidden data (watermark) generator 130 will be described with reference to FIG. 1(b). The digital hidden data (watermark) generator 130 comprises an input 131 of a plurality of watermark parameters. For example, watermark input parametric data may comprise relatively constant data such as data indicating the owner of the protected content and the identity of the protected work and relatively variable data, for example, the distributor, the customer name, the date and time of transaction, the date and time of making of a master, the type of transaction (gift, sale, license or lease), date of expiration, number of permitted plays or other parameter relating to the expiration of any license or lease, the encoding algorithm that was used to encode the signal via perceptual coder 110 or any other related parameter. No particular order is asserted for the parametric data of the watermark. Nevertheless, data representing the various parameters should be advantageously grouped upon input. For example, it may be appropriate to collect variable data such as point of distribution data together (time, date, type of arrangement, identity of recipient, location of distribution) in a separate location from constant data such as copyright owner and identity of the work, for example, by title, track and artist. Some of the data, such as customer identity and date and place of transaction, serves the purpose of assisting one in tracking a would-be pirate. Other data serves to identify the protected information. Yet other data, depending, for example, on the transaction, may prevent a player from further playing or otherwise decoding and utilizing the compressed data stream of protected information.

In the depicted embodiment of FIG. 1(b), the parametric data of watermarking parameters entered at block 131 is encrypted with key K at block 132 which may be the same key K generated by seed 121 or a different key. Of course, the use of such an encryption key K protects the parametric data from piracy or tampering. The encryption may be by any known means and results in a multi-bit digital watermark at block 133. Encryption processes that may be utilized include well known processes such as the DES algorithm, the Cylink algorithm, the algorithm known as pgp (pretty good privacy) and other algorithms known in the art. The generated watermark is input to coefficient quantizer 106 and inserted at the indexed locations selected by the watermark index selector 120. Also, in alternative embodiments, the encryption may involve two, three or more tiers of encryption, for example, involving keys which change periodically as well as fixed keys determined at the time of manufacture (such as secret serial number of a decoder) and are distributed to points in the distribution channel in a protected manner, such as keys of the month. In alternative embodiments, memory cards or smart cards including a secure microprocessor with embedded decryption algorithm may be utilized to distribute new keys periodically or different encryption algorithms for use in decoder devices distributed in the distribution channel to keep pirates guessing.

It may now be apparent that the watermark is inserted in such a manner that it is imperceptible and has no impact on the perceived quality of a coded analog signal 101. Moreover, the watermark itself is not recognizable, even as a digital binary bitstream because 1) it has been encrypted with a key K and 2) the watermark is distributed throughout the output bitstream of quantizer 106 according to a selected percent of watermarking overhead and a seed. It is not easily recognizable and locatable, for example, at the beginning or end of the protected work. Of course, the seed, the key, the selected watermarking overhead, even the characteristics and order of the parametric data comprising the watermark are unknown to the pirate and, consequently, must be generated by the pirate in order to be able to unwatermark the signal. If the pirate is the purchaser and freely distributes copies without authorization, unauthorized copies may include the purchaser's identity in the watermark.

Also, it is important to note that in furtherance of the objective of the present invention that the watermarking of a protected signal may occur anywhere in the distribution channel. At such a point of distribution, all components of the perceptual coder are not required for watermarking a signal. The digital data may already be coded and recorded. It is then fed through a generator for generating a candidate watermarking sequence 124 and requantized and restored with a digital watermark or watermark portion.

It may be desirable to extract the watermark from the encoded data stream. For example, an already included watermark may be extracted and new data added to the digital watermark, for example, at a point of distribution. As another example, a personal computer disc player or other means of utilizing the digital bitstream may extract the watermark and be operative to deny use of the recorded data. In such situations, what will be necessary, depending on the level of encryption applied, is to have access to the key K or keys, the random number sequence and the perceptual coding function applied at transformation and perceptual threshold calculation blocks 104 and 105 respectively.

In an alternative embodiment of a watermark extractor, the watermark may be extracted from the decoded bitstream by transforming the decoded time series into the frequency domain, extracting the watermark bits using the watermarking sequence B(i) and decrypting using key K. Multiple frequency domain transformations may be carried out based on various encoding parameters (segment length, encoding rate and the like) and watermark extraction steps before the correct combination of encoding parameters corresponding to the original watermarking are arrived upon.

In a further alternative embodiment, it may be advantageous to detect and extract a watermark in the decoded bitstream to intentionally insert a synchronization marker at the beginning of the stream. (Placing synchronization markers, however, may assist the pirate in locating the digital watermark.) Nevertheless, the synchronization marker may comprise constant data that need not necessarily comprise the watermark such as data representing the copyright owner, the source, and the identity of the protected work for example by title, track and artist, as some of these should be well known from the protected work itself Title, track and artist may be present for display, for example, in digital program delivery systems known in the art.

In the design of apparatus for playing a watermarked original or pirate copy, a specific field (for example, the encoding algorithm type) is inserted into the watermark. The encryption key and the watermarking sequence are derived from a private key issued to the purchaser at the point of distribution. A decoder apparatus associated with any player will receive the private key and decrypt the watermark to extract the specific field. Play can cease shortly after play begins if the field cannot be found.

Figure 3:
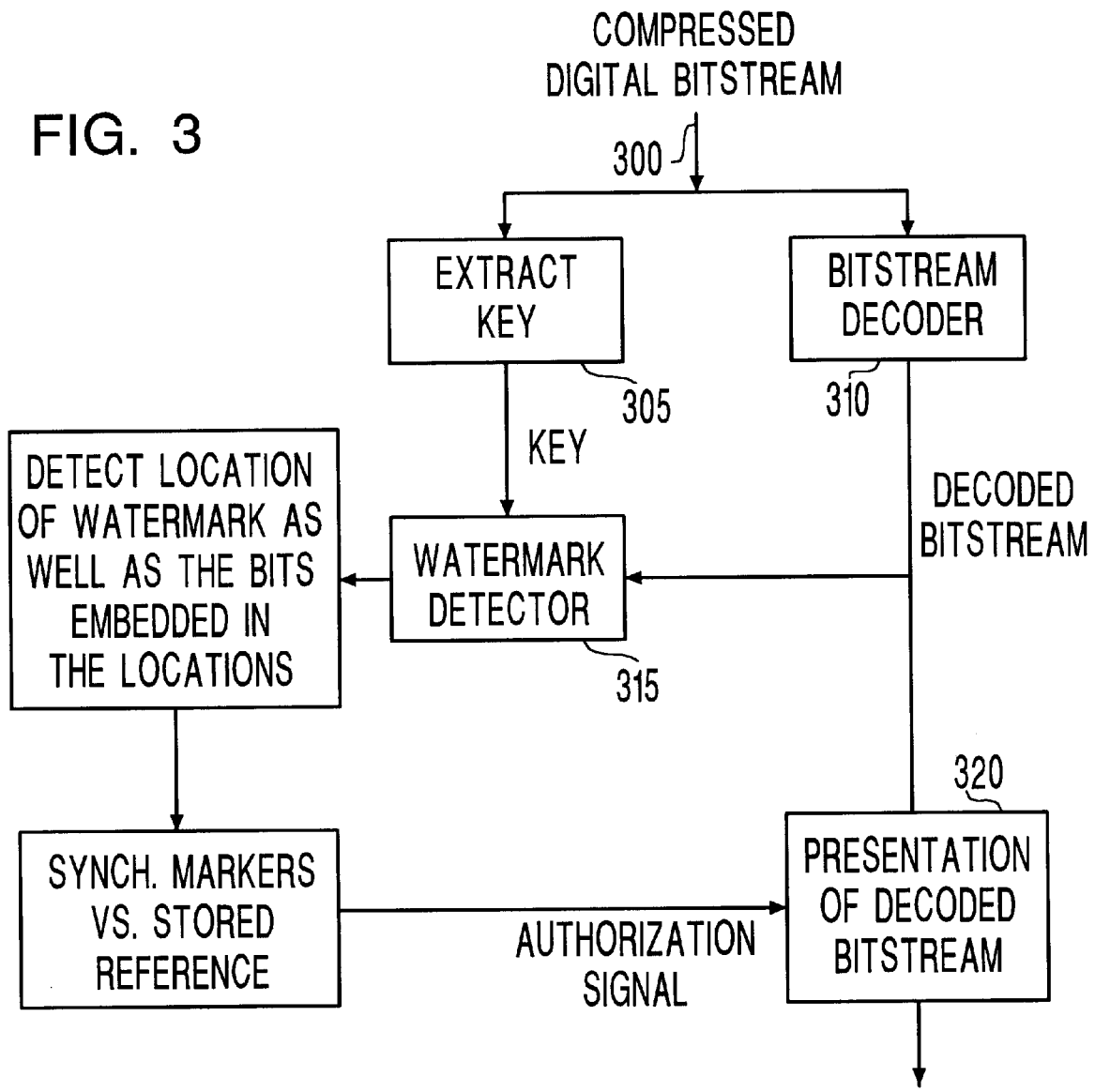
FIG. 3 is a functional block schematic diagram of a decoder/player for use in playing a digital bitstream of information having an embedded, hidden data watermark.

Now referring to FIG. 3, there is shown a decoder for playing protected information according to the present invention, the protected compressed information including hidden data such as a watermark as described above. A compressed digital bitstream is received at point 300 and is presented to a key extractor 305 and to a bitstream decoder 310. The key extractor 305 extracts a key used to encrypt the watermark. A key extractor is optional if the key is transmitted in another way than in the compressed digital bitstream. The key extractor delivers the key, preferably in a secure manner to a watermark detector 315. The bitstream decoder 310 outputs a decoded bitstream which is presented to watermark detector 315 and for presentation, for example, for listening, for playing or for display or other output at presentation box 320. The watermark detector 315 first detects the location of the watermark and then extracts the watermark at the indexed locations. As already indicated, the watermark may indicate an expiration date or a finite number of plays. If the expiration date has expired or the number of plays exceeded, then an authorization signal to deny play is presented to presentation step 320; otherwise, play is permitted by the authorization signal.

Thus, there has been shown and described a method and apparatus for digitally watermarking a binary bitstream output of a perceptual coder, simultaneously with or after perceptual coding that meets the objectives sought. Any United States Patents or patent applications referenced herein should be deemed to be incorporated by reference as to their entire contents. Variations and alternative embodiments of the present invention which may become readily apparent to one of ordinary skill reading the above description of the invention should be deemed to be encompassed within its scope which should only be construed to be limited by the claims which follow.

What we claim is:

1. Apparatus for inserting a digital watermark into protected information comprises a transformation function of a perceptual coder for coding an information signal representative of the protected information, a watermark location selector responsive to the perceptual coder for selecting a location for inserting a digital watermark, said watermark location selector including a logical gate responsive to a random number generator, said random number generator, responsive to a seed and a selection of a watermark overhead, for outputting a binary sequence, a digital watermark generator for generating a digital watermark sequence responsive to a plurality of predetermined watermark parameters and a quantizer of the perceptual coder responsive to the digital watermark generator and the watermark location selector for inserting a digital watermark at selected locations within an output bitstream, said output bitstream including the perceptually coded information signal.

2. Apparatus as recited in claim 1 wherein said transformation function comprises a modified discrete cosine transform for transforming from the time domain to the frequency domain and outputting spectral coefficients for comparison with a perceptual threshold, a coefficient being below the threshold identifying that coefficient as a candidate location for a portion of a digital watermark.

3. Apparatus as recited in claim 1 wherein said transformation function comprises a discrete cosine transform for transforming from the time domain to the frequency domain and outputting spectral coefficients for comparison with a perceptual threshold, a coefficient being below the threshold identifying that coefficient as a candidate location for a portion of a digital watermark.

4. Apparatus as recited in claim 1 wherein said transformation function comprises an N point fast Fourier transform for transforming from the time domain to the frequency domain and outputting spectral coefficients for comparison with a perceptual threshold, a coefficient being below the threshold identifying that coefficient as a candidate location for a portion of a digital watermark.

5. Apparatus as recited in claim 1 wherein said logical gate of said watermark location selector comprises a logical AND gate, said logical AND gate being responsive to said binary sequence output of said random number generator and said watermarking sequence output of said watermark generator.

6. Apparatus as recited in claim 1 wherein said digital watermark generator comprises an input comprising said plurality of predetermined watermarking parameters including play authorization data.

7. Apparatus as recited in claim 6 wherein said plurality of watermarking parameters comprises one of data representing an identity of a recipient of said protected information and data representing an identity of a perceptual coding transformation algorithm.

8. Apparatus as recited in claim 6 wherein said plurality of watermarking parameters comprises one of data representing an identity of a contractual arrangement and data representing an identity of the date of said contractual relationship.

9. Apparatus as recited in claim 8 wherein said contractual arrangement comprises a lease and said plurality of watermarking parameters further comprises data indicative of an expiration date of said lease representing a date after which access to said protected information is to be denied.

10. Apparatus as recited in claim 6 wherein said plurality of watermarking parameters is encrypted prior to insertion.

11. Apparatus as recited in claim 1 wherein said digital watermark generator comprises means for encrypting a plurality of watermarking parameters with a key K related to said seed.

12. Apparatus as recited in claim 1 wherein said digital watermark generator comprises means for encrypting a plurality of watermarking parameters with a key K unrelated to said seed.

13. Apparatus as recited in claim 1 wherein said protected information comprises video data and said quantization has a step size selected according to the magnitude of errors that will not be visible.

14. A method for inserting a digital watermark into protected information comprising the steps of
   perceptually encoding an information signal representative of the protected information,
   selecting, responsive to the perceptual coding step, a location for inserting a digital watermark including the step of generating a binary sequence using a random number generator responsive to selecting a seed and a watermark overhead and providing said binary sequence to a logical gate,
   generating a digital watermark sequence responsive to a plurality of watermark parameters for input to said logical gate, and
   during perceptual coding, quantizing the information signal to insert the generated digital watermark at selected locations within an output bitstream, said output bitstream including the perceptually coded information signal.

15. A method as recited in claim 14 wherein said perceptual coding comprises a transformation function of a modified discrete cosine transform for transforming from the time domain to the frequency domain and outputting spectral coefficients for comparison with a perceptual threshold, a coefficient being below the threshold identifying that coefficient as a candidate location for a portion of a digital watermark.

16. A method as recited in claim 14 wherein said perceptual coding comprises a transformation function of a discrete cosine transform for transforming from the time domain to the frequency domain and outputting spectral coefficients for comparison with a perceptual threshold, a coefficient being below the threshold identifying that coefficient as a candidate location for a portion of a digital watermark.

17. A method as recited in claim 14 wherein said perceptual coding comprises a transformation function of an N point fast Fourier transform for transforming from the time domain to the frequency domain and outputting spectral coefficients for comparison with a perceptual threshold, a coefficient being below the threshold identifying that coefficient as a candidate location for a portion of a digital watermark.

18. A method as recited in claim 14 wherein said step of selecting a watermark location comprises generating a random number binary sequence and logical ANDing an output of said random number generator and a candidate watermarking sequence.

19. A method as recited in claim 18 wherein said step of generating a random number is responsive to inputting a seed and selecting a watermarking overhead.

20. A method as recited in claim 14 wherein said step of generating a digital watermark comprises an input comprising said plurality of watermarking parameters including play authorization data.

21. A method as recited in claim 20 wherein said plurality of watermarking parameters comprises one of data representing an identity of a recipient of said protected information and data representing an identity of a perceptual coding transformation algorithm.

22. A method as recited in claim 20 wherein said plurality of watermarking parameters comprises one of data representing an identity of a contractual arrangement and data representing an identity of the date of said contractual relationship.

23. A method as recited in claim 22 wherein said contractual arrangement comprises a lease and said plurality of watermarking parameters further comprises data indicative of an expiration date of said lease representing a date after which access to said protected information is to be denied.

24. A method as recited in claim 20 wherein said plurality of watermarking parameters is encrypted prior to insertion.

25. A method as recited in claim 19 wherein said digital watermark generating step comprises encrypting a plurality of watermarking parameters with a key K related to said seed.

26. A method as recited in claim 19 wherein said step of generating a digital watermark comprises encrypting a plurality of watermarking parameters with a key K unrelated to said seed.

27. A method as recited in claim 14 wherein said protected information comprises video data and said quantization step has a step size selected according to the magnitude of errors that will not be visible.

28. Apparatus for inserting a hidden data stream into a perceptually encoded media stream comprising
   an N point transform for outputting N coefficients and
   a quantizer for selecting a scale factor, quantizing the input N coefficients and inserting the hidden data stream in indexed locations of the perceptually encoded media stream responsive to said N point transform, said indexed locations being determined responsive to selection of a seed and a watermark overhead for input to a random number generator for generating a binary sequence.

29. Decoder apparatus for detecting a watermark for authorizing play, said watermark being generated responsive to an input comprising a plurality of watermarking parameters including play authorization data and being located responsive to selection of a key and a watermark overhead comprising a key receiver for receiving a key relating to said location of a watermark, a watermark detector responsive to the key receiver for locating the watermark and for analyzing if the watermark contains play authorization data and a presentation circuit for presenting a decoded information signal responsive to the watermark detector when said play authorization data of said watermark authorizes play.

30. Decoder apparatus for detecting a digital watermark in an information signal, the digital watermark being generated responsive to an input comprising a plurality of watermarking parameters including play authorization data and being located responsive to selection of a key and a watermark overhead and including the name of a customer and the date and location of a transaction, and for outputting the watermark for tracing an unlicensed copy of the information signal to a pirate, the unlicensed copy including said watermark.

31. A method for inserting a digital watermark into protected information comprising the steps of perceptually encoding an information signal representative of the protected information, selecting, responsive to the perceptual coding step, a location for inserting a digital watermark, generating a digital watermark including a plurality of watermark parameters, and during perceptual coding, manipulating perceptual coding coefficients to insert the generated digital watermark at selected locations within an output bitstream, the output bitstream including the perceptually coded information signal, said selection of locations for the generated watermark being responsive to a comparison of said perceptual coding coefficients with a calculated perceptual threshold and includes the steps of selecting a watermark overhead and a seed for input to a random number generator.

32. A method for inserting a digital watermark into protected information as recited in claim 31 wherein said protected information comprises audio information.

33. A method for inserting a digital watermark into protected information characterized by the steps of determining a candidate digital watermark sequence, selecting a digital watermark overhead for controlling generation of a binary output sequence for logical combination with said candidate digital watermark sequence and locating, responsive to said logical combination and said selected digital watermark overheads, a digital watermarking sequence generated responsive to a plurality of watermark parameters into said protected information data signal.

34. A method as recited in claim 33 wherein said step of selecting a digital watermark overhead provides an input to a random number generator whose output is provided to a logical gate for logical combination with said candidate digital watermark sequence.

35. A method as recited in claim 34 wherein said output of said random number generator is further determined by the selection of a seed as a further input.

36. A method as recited in claim 34 wherein said digital watermark overhead is selected as one of a percent or a probability of a binary output of the random number generator being equal to one.

* * * * *